May 14, 1940.  H. N. STICKLIN  2,200,565
UNIVERSAL JOINT OAR HOLDER AND OARLOCK
Filed March 28, 1938
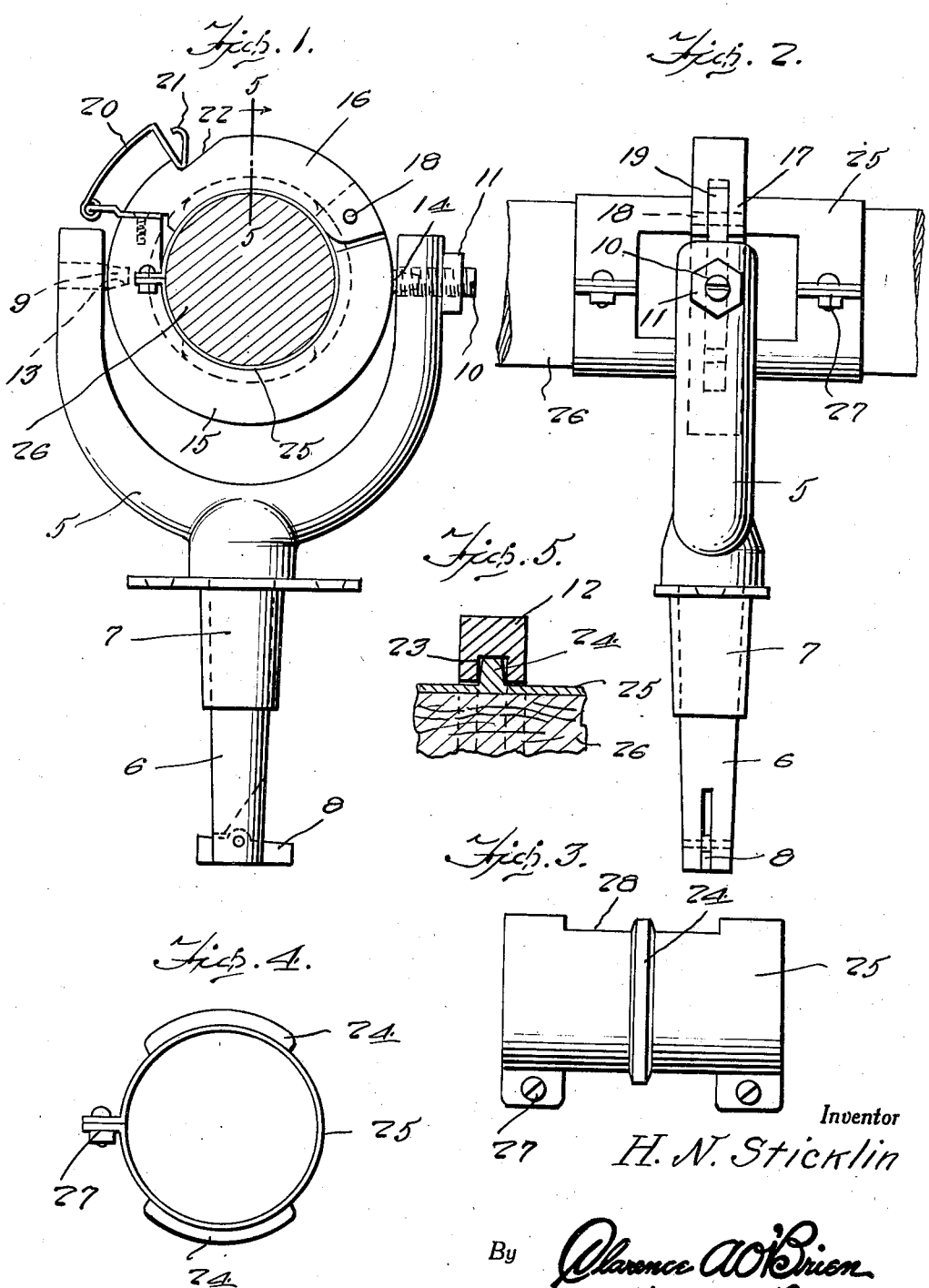

Patented May 14, 1940

2,200,565

UNITED STATES PATENT OFFICE 2,200,565

UNIVERSAL JOINT OAR HOLDER AND OARLOCK

Hugh N. Sticklin, Olympia, Wash.

Application March 28, 1938, Serial No. 198,596

2 Claims. (Cl. 9—26)

My invention is primarily an oarlock where the oar is securely locked in place yet allows freedom of motion in all the directions which are necessary in rowing a boat.

Fig. 1 is a transverse sectional view through an oar showing the oarlock and holder in position thereon.

Figure 2 is a side elevational view.

Figure 3 is a side elevational view of the sleeve for the oar.

Figure 4 is an end elevational view of the sleeve and

Figure 5 is a fragmentary sectional view taken substantially on a line 5—5 of Figure 1.

Referring now to the drawing in detail the numeral 5 designates the yoke portion of the oarlock having the stem 6 which is rotatably mounted in the bearing 7 adapted for securing to the edge of the gunwale of a boat.

The lower end of the stem is provided with a pivoted cross catch 8 adapted to prevent accidental removal of the oarlock from the bearing 7.

An inwardly projecting trunnion 9 is formed on one end of the yoke 5 and the other end of the yoke is provided with a bearing 10 secured in adjusted position by a nut 11. A ring member 12 is provided in one edge with a tapering recess 13 conformably receiving the trunnion 9 while a diametrically opposite side of the ring is formed with a trunnion 14 adapted for insertion in the recessed inner end of the screw 12 to provide a pivotal mounting for the ring.

The ring 12 is constructed of a relatively large section 15 and a relatively small section 16, one end of the small section 16 being bifurcated at 17 for pivotally mounting the same on a pin 18 carried by a reduced extension 19 of the adjacent end of the larger section. To the other end of the large section 15 is pivotally attached a spring catch 20 having a lateral extension 21 at its free end adapted for engaging in a notch 22 formed in the outer periphery of the smaller section 16, adjacent its free end.

The inner periphery of the ring 12 is formed with a circumferential groove 23, which extends throughout both of the sections of the ring for rotatably receiving an interrupted rib 24 formed at diametrically opposite sides on the periphery of a sleeve 25 which is split longitudinally for clamping upon an oar 26 by means of the bolt 27. Openings 28 are formed in the sleeve at its portions not provided with the rib 24 to facilitate the expanding and contracting action of the sleeve during its clamping engagement with the oar.

From the foregoing it will be apparent that a swivel mounting is provided for the oar which will permit its free movement during its normal use.

I claim:

1. An oarlock comprising a supporting yoke, a transversely split ring member so as to provide a large and a small section hingedly connected to each other, said large section being pivotally supported at diametrically opposite sides to the arms of said yoke, said ring member having an internal circumferential groove and a longitudinally split oar accommodating sleeve positioned in the ring and having an external interrupted circumferential rib intermediate its ends and seated in said groove, said interrupted rib facilitating removal of the sleeve from the ring upon the opening of said smaller hinged section.

2. An oarlock comprising a supporting yoke, a transversely divided ring member, including a larger section and a smaller section hingedly connected together, catch means releasably securing the sections together, trunnions pivotally supporting diametrically opposite edges of the larger ring section to the yoke, an internal circumferential groove in the ring member and a longitudinally split oar accommodating sleeve having an interrupted external circumferential rib seated in said groove, said interrupted rib facilitating removal of the sleeve from the ring upon the opening of said smaller hinged section.

HUGH N. STICKLIN.